United States Patent
Orteu et al.

(10) Patent No.: US 12,017,756 B2
(45) Date of Patent: Jun. 25, 2024

(54) STRUCTURAL ASSEMBLY FOR AN AIRCRAFT

(71) Applicant: Airbus Operations (S.A.S.), Toulouse (FR)

(72) Inventors: Benoit Orteu, Toulouse (FR); Ludovic Mil, Toulouse (FR); Lionel Laganier, Toulouse (FR); Dominique Marty, Toulouse (FR); Philippe Robert, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 14 days.

(21) Appl. No.: 17/983,782

(22) Filed: Nov. 9, 2022

(65) Prior Publication Data

US 2023/0148389 A1    May 11, 2023

(30) Foreign Application Priority Data

Nov. 10, 2021   (FR) ........................ 2111955

(51) Int. Cl.
| | |
|---|---|
| *B64C 25/16* | (2006.01) |
| *B64C 1/18* | (2006.01) |
| *B64C 25/04* | (2006.01) |
| *B64C 25/14* | (2006.01) |

(52) U.S. Cl.
CPC ............ *B64C 25/16* (2013.01); *B64C 1/18* (2013.01); *B64C 25/04* (2013.01); *B64C 25/14* (2013.01)

(58) Field of Classification Search
CPC ......... B64C 25/04; B64C 25/14; B64C 25/16; B64C 1/00; B64C 1/06; B64C 1/0683
See application file for complete search history.

(56) References Cited

U.S. PATENT DOCUMENTS

| | | | |
|---|---|---|---|
| 7,338,013 B2 * | 3/2008 | Vetillard | B64C 1/18 244/118.1 |
| 7,874,516 B2 | 1/2011 | Cacciaguerra | |
| 8,066,221 B2 * | 11/2011 | Rouyre | B64C 7/00 244/119 |

(Continued)

FOREIGN PATENT DOCUMENTS

| | | | | |
|---|---|---|---|---|
| GB | 2448997 A | * | 11/2008 | ............... B64C 1/08 |
| WO | WO 2006/051235 A1 | | 5/2006 | |

OTHER PUBLICATIONS

French Search Report for Application No. 2111955 dated May 30, 2022.

*Primary Examiner* — Tien Q Dinh
*Assistant Examiner* — Katherine June Bolek
(74) *Attorney, Agent, or Firm* — KDW Firm PLLC

(57) ABSTRACT

A structural assembly for an aircraft having pairs of main gantries distributed in the longitudinal direction, two transverse panels fixed to the front and the rear of the pairs of main gantries to together define a compartment for a landing gear of the aircraft, at least one pair of secondary gantries between the main gantries, at least one crossmember parallel to the transverse panels and that straddles at least one secondary gantry, and, for each secondary gantry and each crossmember straddling the secondary gantry, a connecting rod mounted to be able to freely rotate, via a first end, on a lower part of the crossmember and, via a second end, on an outer lateral part of the secondary gantry. Such an arrangement reduces the vertical bulk of the structural assembly.

19 Claims, 4 Drawing Sheets

(56) References Cited

U.S. PATENT DOCUMENTS

| | | | | |
|---|---|---|---|---|
| 8,205,832 | B2* | 6/2012 | Schroeer | B64C 1/18 |
| | | | | 244/119 |
| 9,359,084 | B2* | 6/2016 | Durand | B64D 43/00 |
| 10,071,797 | B2* | 9/2018 | Guering | B64C 1/18 |
| 10,870,476 | B2* | 12/2020 | Doran | B64D 11/003 |
| 2010/0230535 | A1 | 9/2010 | Huber et al. | |
| 2016/0185451 | A1 | 6/2016 | Bellet et al. | |
| 2019/0112035 | A1 | 4/2019 | Bellet et al. | |
| 2019/0118976 | A1* | 4/2019 | Brindeau | B64F 5/10 |

* cited by examiner

STRUCTURAL ASSEMBLY FOR AN AIRCRAFT

TECHNICAL FIELD

The disclosure herein relates to the field of aircraft, in particular to a structural assembly of an aircraft. The disclosure herein thus relates to an aircraft having such a structural assembly.

BACKGROUND

An aircraft conventionally has a fuselage that exhibits a structure to which is fixed a skin ensuring, among other things, the sealing of the cabin accommodated in the fuselage with respect to the outside.

The aircraft likewise has landing gears which can be retracted into the fuselage once the aircraft is in flight. In order to accommodate a landing gear, the aircraft has a compartment which is delimited or defined inside the fuselage and which has walls forming a sealed barrier. This compartment has an opening to the outside to allow the landing gear to pass through and a door which is closed to shut off the opening once the landing gear is retracted.

FIG. 4 shows a section through an aircraft 400 of the prior art in a plane perpendicular to the longitudinal direction X of the aircraft 400. FIG. 4 shows a structural assembly 402 which, in this instance, has a plurality of main gantries 404a-b distributed and fixed together in the longitudinal direction of the structural assembly 402 and two transverse panels (which are not shown) at the front and the rear of the main gantries 404a-b that together delimit or define the compartment 50 for the landing gear. The main gantries 404a-b are incorporated in the structure 404 of the aircraft 400 to which the skin is fixed. Each main gantry 404a-b takes the form of an arch.

The structural assembly 402 likewise has pairs of secondary gantries 408a-b which extend parallel to the longitudinal direction X between the main gantries 404a-b and which are fixed by their ends to the transverse panels.

A plurality of transverse walls 410 is fixed between each pair of secondary gantries 408a-b. The transverse walls 410 are distributed in the longitudinal direction X.

Linings 412 are fixed between the main gantries 404a-b and the transverse panels. These linings 412 constitute the threshold of the compartment 50 and they form a sealed barrier between the compartment 50 and the rest of the aircraft 400. The linings 412 extend beneath the secondary gantries 408a-b and the transverse walls 410 and they are fixed at the bottom part of the secondary gantries 408a-b.

Over the width of the aircraft 400, the structural assembly 402 likewise has a plurality of crossmembers 406, in this instance three crossmembers, which extend transversely with respect to the longitudinal direction X, that is to say parallel to the transverse panels. A plurality of these three crossmembers 406 is distributed in the longitudinal direction X.

A floor 414 and the rails for fixing passenger seats are fixed to these crossmembers 406. The floor 414 is likewise fixed to the main gantries 404a-b.

The crossmembers 406 are disposed above the secondary gantries 408a-b and each crossmember 406 is disposed in a straddling manner between two secondary gantries 408a-b of different pairs or between a secondary gantry 408a-b and a main gantry 404a-b.

Each crossmember 406 is connected to the two secondary gantries 408a-b or to the secondary gantry 408a-b and to the main gantry 404a-b via two connecting rods 416 and each connecting rod 416 is mounted so as to be able to freely rotate, via a first end, on a lower part of the crossmember 406 and, via its second end, on an upper part of the secondary gantry 408a-b or of the main gantry 404a-b.

Each rotation is performed about an axis of rotation transverse with respect to the longitudinal direction X.

Although such an arrangement is entirely satisfactory, it is necessary to find an arrangement that makes it possible to gain space, in particular vertically, by reducing the distance between the floor 414 and the linings 412.

SUMMARY

An object of the disclosure herein is a structural assembly of an aircraft, in particular in a compartment for a landing gear, which has a reduced height.

To that end, a structural assembly for an aircraft is disclosed having a longitudinal direction and a median plane, the structural assembly having:
- a plurality of pairs of main gantries, wherein, for a pair, the main gantries face one another with respect to the median plane and wherein the pairs are distributed in the longitudinal direction,
- two transverse panels that are perpendicular to the longitudinal direction and are fixed at the front and the rear of the plurality of pairs of main gantries to together delimit a compartment for a landing gear of the aircraft,
- at least one pair of secondary gantries which extend parallel to the longitudinal direction between the main gantries and the ends of which are fixed to the transverse panels,
- at least one crossmember which extends parallel to the transverse panels and is disposed in a manner straddling at least one secondary gantry, and,
- for each secondary gantry and each crossmember straddling the secondary gantry, a connecting rod mounted so as to be able to freely rotate, via a first end, on a lower part of the crossmember and, via a second end, on an outer lateral part of the secondary gantry.

Such an arrangement reduces the vertical bulk of the structural assembly.

According to an embodiment, each connecting rod extends vertically between the crossmember and the secondary gantry.

According to an embodiment, each connecting rod extends from the secondary gantry, rising towards the crossmember as it moves away from the secondary gantry.

Advantageously, between each pair of secondary gantries, the structural assembly has at least one transverse wall fixed between the secondary gantries of the pair, wherein the at least one transverse wall is inscribed in a plane perpendicular to the longitudinal direction; for the or each transverse wall, at least one crossmember is disposed above the transverse wall; and the structural assembly has two additional connecting rods mounted so as to be able to freely rotate, via a first end, on a lower part of the crossmember and, via a second end, on an upper lateral part of the transverse wall.

Advantageously, each additional connecting rod extends vertically between the crossmember and the transverse wall.

Advantageously, for each connecting rod, the rotation is performed about an axis of rotation parallel to the longitudinal direction.

The disclosure herein also proposes an aircraft having a landing gear and a structural assembly according to one of the preceding variants, wherein the landing gear retracts into the compartment.

BRIEF DESCRIPTION OF THE DRAWINGS

The features of the disclosure herein mentioned above, along with others, will become more clearly apparent upon reading the following description of an exemplary embodiment, the description being given with reference to the appended drawings, in which.

DETAILED DESCRIPTION

Figure 1:
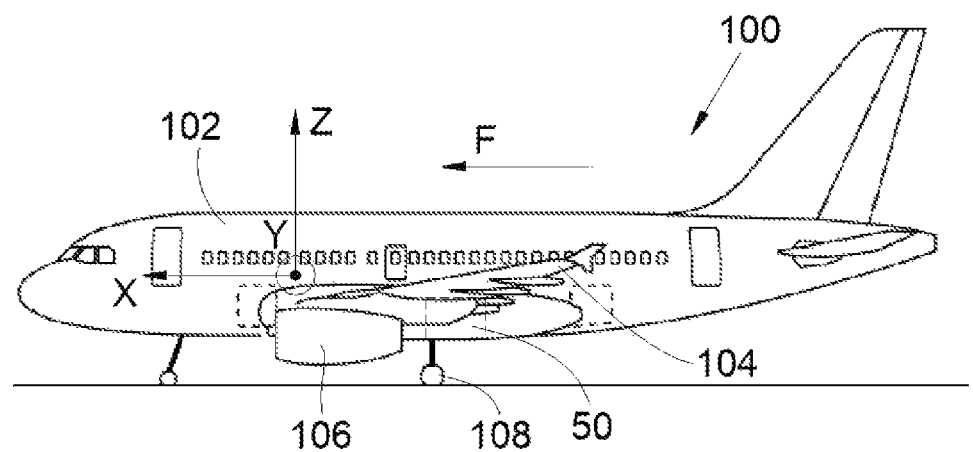
FIG. 1 is a side view of an aircraft having a structural assembly according to the disclosure herein.

FIG. 1 shows an aircraft 100 which has a fuselage 102, on either side of which a wing 104 is fixed. At least one propulsion system 106 is fixed beneath each wing 104.

By convention, the X direction is the longitudinal direction of the aircraft 100, the Y direction is the transverse direction of the aircraft 100, which is horizontal when the aircraft is on the ground, and the Z direction is the vertical direction or vertical height when the aircraft is on the ground, these three directions X, Y and Z being mutually orthogonal.

Moreover, the terms "front" and "rear" should be considered with respect to a direction of forward movement of the aircraft 100 during operation of the propulsion systems 106, this direction being depicted schematically by the arrow F.

The aircraft 100 also has landing gears, in particular a main gear 108, which retracts into a compartment 50 accommodated inside the fuselage 102. As in the prior art, the compartment 50 has an opening to the outside to allow the landing gear 108 to pass through and a door which is closed to shut off the opening once the landing gear 108 is retracted.

Figure 2:
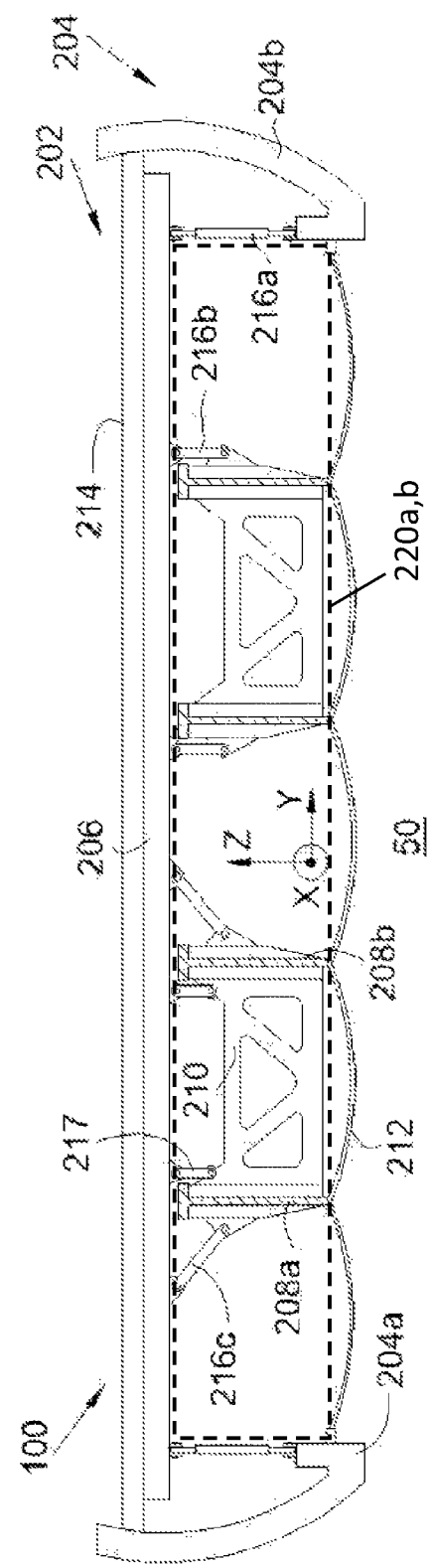
FIG. 2 is a sectional view of the fuselage of the aircraft of FIG. 1 at a compartment for a landing gear according to the disclosure herein.
Figure 4:
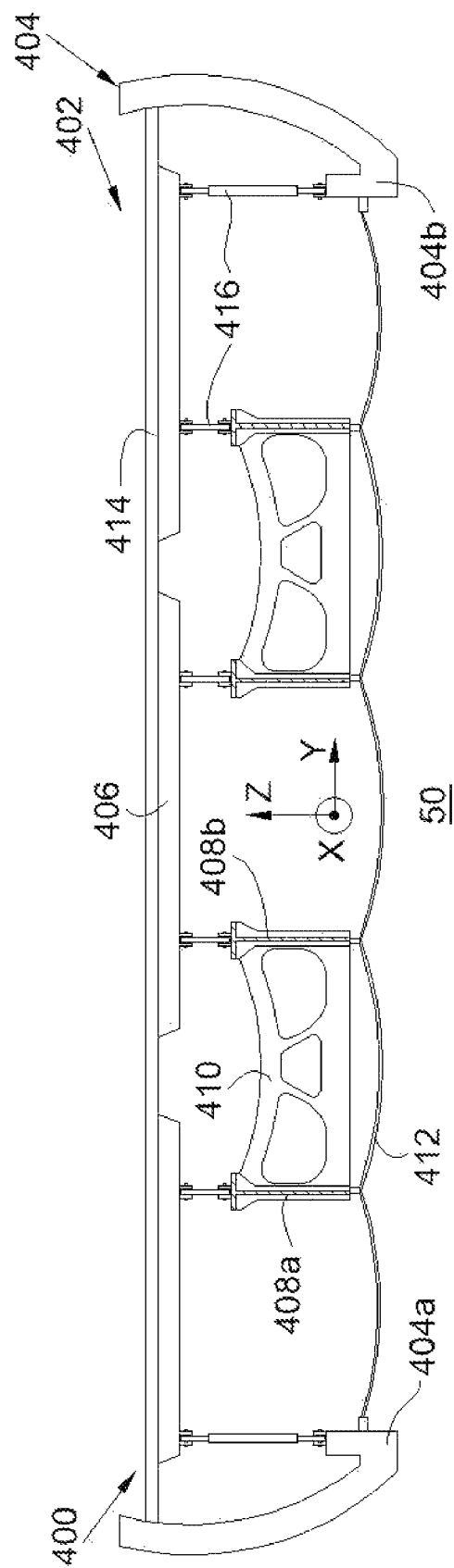
FIG. 4 is a sectional view of the fuselage of an aircraft of the prior art at a compartment for a landing gear.

FIG. 2 is a view similar to FIG. 4 (which has already been explained) for a structural assembly 202 according to the disclosure herein.

The compartment 50 is delimited inside the fuselage 102 and has walls forming a sealed barrier.

Figure 3:
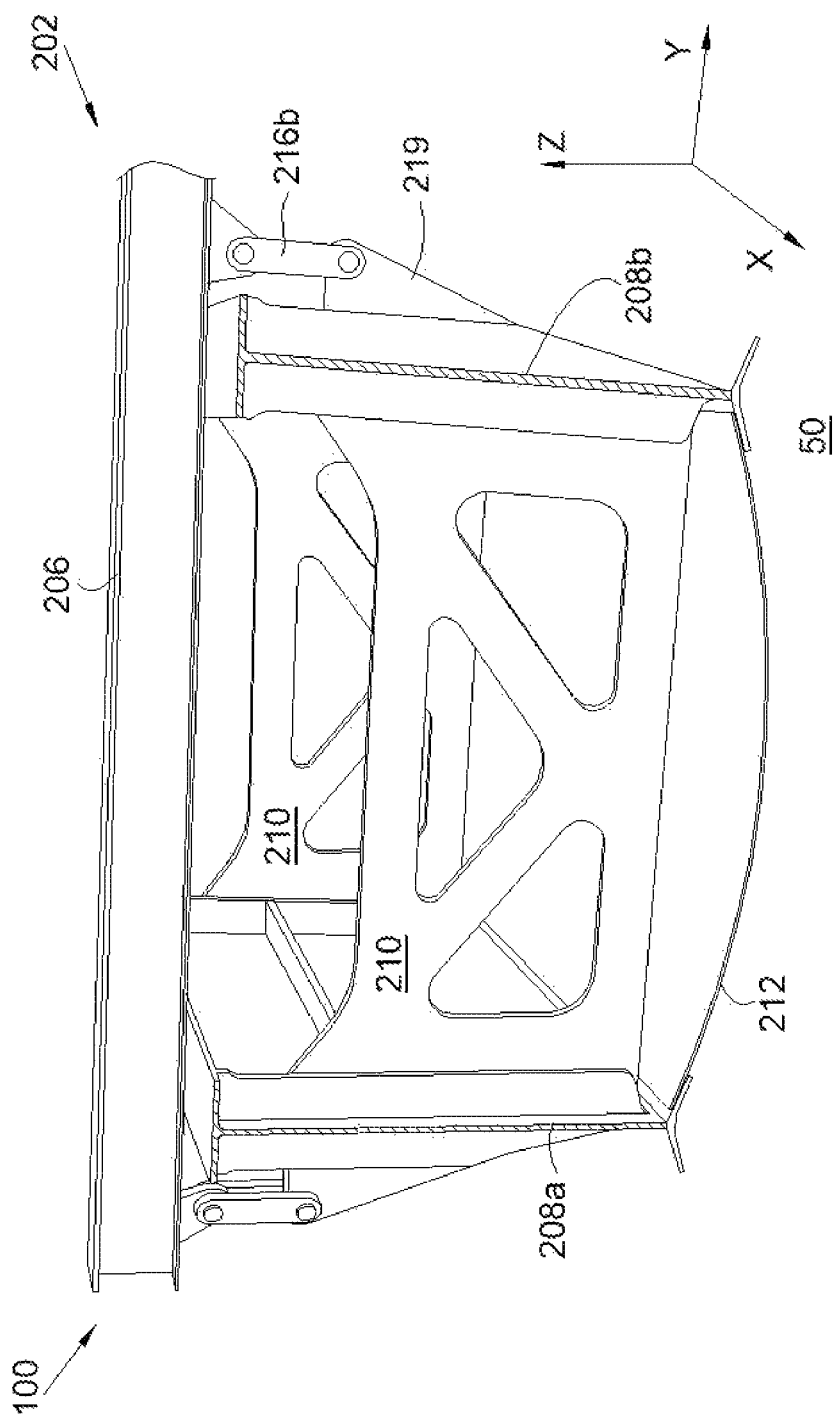
FIG. 3 is a perspective view of a structural assembly according to an embodiment of the disclosure herein.

FIG. 2 shows a section through the aircraft 100 according to the disclosure herein in a plane perpendicular to the longitudinal direction X. FIG. 2 and FIG. 3 show a structural assembly 202 which has the same longitudinal direction X and has a plurality of main gantries 204a-b distributed and fixed together in the longitudinal direction X of the structural assembly 202 and two transverse panels 220a-b (which are shown schematically, in broken line, in FIG. 2) that are fixed at the front and the rear of the plurality of main gantries 204a-b and together delimit the compartment 50 for the landing gear. The main gantries 204a-b are incorporated in the structure 204 of the aircraft 100 to which the skin is fixed and each main gantry 204a-b takes the form of an arch. The main gantries 204a-b are distributed in pairs over the length of the structural assembly 202 and, for a pair, the main gantries 204a-b face one another with respect to a median plane XZ of the aircraft 100.

The main gantries 204a-b are distributed parallel to the longitudinal direction X and the transverse panels 220a-b are perpendicular to the longitudinal direction X.

The structural assembly 202 likewise has at least one pair of secondary gantries 208a-b which extend parallel to the longitudinal direction X between the main gantries 204a-b and which are fixed by their ends to the transverse panels 220a-b.

A plurality of transverse walls 210 is fixed between each pair of secondary gantries 208a-b. The transverse walls 210 are distributed in the longitudinal direction X and each transverse wall 210 is inscribed in a plane perpendicular to the longitudinal direction X. The transverse walls 210 are fixed to the secondary gantries 208a-b by any suitable means, such as by welding, clamping screws, etc.

Depending on the width of the aircraft 100, there may be multiple pairs of secondary gantries 208a-b juxtaposed in the transverse direction Y and, in the embodiment of the disclosure herein presented here, over this same width, there are then as many transverse walls 210 as pairs of secondary gantries 208a-b and the transverse walls 210 are aligned in this same transverse direction Y.

Linings 212 are fixed between the main gantries 204a-b and the transverse panels 220a-b. These linings 212 constitute the threshold of the compartment 50 and they form a sealed barrier between the compartment 50 and the rest of the aircraft 100. The linings 212 extend beneath the secondary gantries 208a-b and the transverse walls 210 and they are fixed at the bottom part of the secondary gantries 208a-b.

Over the width of the aircraft 100, the structural assembly 202 likewise has a crossmember 206 which extends transversely with respect to the longitudinal direction X, that is to say, parallel to the transverse panels 220a-b. A plurality of crossmembers 206 is distributed in the longitudinal direction X.

In the embodiment of the disclosure herein shown in FIG. 2, there is a single crossmember 206 over the width of the aircraft 100, but there may be multiple crossmembers which are aligned over the width of the aircraft 100, as in the case of the prior art.

In general, there is therefore at least one crossmember 206 which extends parallel to the transverse panels 220a-b and is disposed in a manner straddling at least one secondary gantry 208a-b, that is to say extending on either side of the secondary gantry 208a-b. When there is a single crossmember 206, the latter straddles all the secondary gantries 208a-b.

A floor 214 and the rails for fixing passenger seats are fixed to these crossmembers 206. The floor 214 is likewise fixed to the main gantries 204a-b.

The crossmembers 206 are disposed above the secondary gantries 208a-b and the main gantries 204a-b, and each crossmember 206 is disposed above the secondary gantries 208a-b and the main gantries 204a-b.

Each crossmember 206 is also disposed above at least one transverse wall 210 and multiple transverse walls when they are aligned in the transverse direction Y.

Each crossmember 206 is connected to each secondary gantry 208a-b and to the longitudinal beams 404a-b by connecting rods 216a-c.

Thus, for each crossmember 206, the structural assembly 202 has two connecting rods of a first type 216a, and each connecting rod of the first type 216a provides the connection between one of the main gantries 204a-b and the crossmember 206. Each connecting rod of the first type 216a is mounted so as to be able to freely rotate, via a first end, on a lower part of the crossmember 206 and, via its second end, on an upper part of the main gantry 204a-b. For each connecting rod of the first type 216a, the rotation is performed about an axis of rotation transverse with respect to the longitudinal direction X. These connecting rods of the first type 216a take the overall form of the prior art connecting rods 416 associated with the same elements. The connecting rods of the first type 216a extend vertically between the crossmember 206 and the main gantry 204a-b.

Thus, for each crossmember 206 and for each secondary gantry 208a-b, the structural assembly 202 has a connecting rod of a second type 216b or of a third type 216c which provides the connection between the secondary gantry 208a-b and the crossmember 206. Each connecting rod of the second type 216b and of the third type 216c is mounted so as to be able to freely rotate, via a first end, on a lower part of the crossmember 206 and, via its second end, on an outer lateral part of the secondary gantry 208a-b. For each connecting rod of the second type 216b and of the third type 216c, the rotation is performed about an axis of rotation parallel to the longitudinal direction X for easy mounting reasons. By contrast to the connecting rods 416 of the prior art, the connecting rods of the second type 216b and of the third type 216c are transversely offset and are not attached to the upper part of the longitudinal beams. The lateral offset makes it possible to gain space by moving the secondary gantries 208a-b closer to the crossmember 206, and the vertical bulk of the structural assembly 202 is thus reduced, thereby reducing the distance between the floor 214 and the linings 212. The outer lateral part of the secondary gantry 208a-b is the part that is on the other side of the secondary gantry 208a-b with respect to the transverse wall 210 which is between the secondary gantries 208a-b. In the embodiment of the disclosure herein presented in FIGS. 2 and 3, each secondary gantry 208a-b has a lateral extension 219 on which the connecting rod of the second type 216b or of the third type 216c is mounted in a hinged manner and each lateral extension 219 is for example an added part fixed to the secondary gantry 208a-b.

In general, for each secondary gantry 208a-b and each crossmember 206 straddling the secondary gantry 208a-b, the structural assembly 202 has a connecting rod of a second type 216b or of a third type 216c.

In a first embodiment of the disclosure herein, the connecting rods of the second type 216b extend vertically between the crossmember 206 and the secondary gantry 208a-b.

In a second embodiment of the disclosure herein, the connecting rods of the third type 216c extend at an angle with respect to the vertical direction Z between the crossmember 206 and the secondary gantry 208a-b. The connecting rod of the third type 216c thus advances from the secondary gantry 208a-b, rising towards the crossmember 206 as it moves away from the secondary gantry 208a-b.

In the second embodiment of the disclosure herein, for each transverse wall 210 and each crossmember 206, the structural assembly 202 has two additional connecting rods 217 which provide the connection between each end of the transverse wall 210 and the crossmember 206. The two additional connecting rods 217 are therefore also offset laterally with respect to the secondary gantry 208a-b. Each additional connecting rod 217 is mounted so as to be able to freely rotate, via a first end, on a lower part of the crossmember 206 and, via its second end, on an upper lateral part of the transverse wall 210. For each additional connecting rod 217, the rotation is performed about an axis of rotation parallel to the longitudinal direction X. Each additional connecting rod 217 is thus on the other side of the secondary gantry 208a-b with respect to the connecting rod of the third type 216c.

In general, between each pair of secondary gantries 208a-b, the structural assembly 202 has at least one transverse wall 210 fixed between the secondary gantries 208a-b of the pair, wherein the at least one transverse wall 210 is inscribed in a plane perpendicular to the longitudinal direction X. For the or each transverse wall 210, at least one crossmember 206 is disposed above the transverse wall 210, and the structural assembly 202 has two additional connecting rods 217 mounted so as to be able to freely rotate, via a first end, on a lower part of the or a crossmember 206 and, via their second end, on an upper lateral part of the transverse wall 210.

The additional connecting rods 217 extend vertically between the crossmember 206 and the transverse wall 210.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structural assembly for an aircraft having a longitudinal direction and a median plane, the structural assembly comprising:
    a plurality of pairs of main gantries, wherein, for a pair, the main gantries face one another with respect to the median plane and wherein the pairs are distributed in the longitudinal direction;
    two transverse panels that are perpendicular to the longitudinal direction and are fixed to a front and a rear of the plurality of pairs of main gantries to together define a compartment for a landing gear of the aircraft;
    at least one pair of secondary gantries which extend parallel to the longitudinal direction between the main gantries and ends of which are fixed to the transverse panels;
    one or more transverse walls fixed between each pair of the secondary gantries and inscribed in a plane perpendicular to the longitudinal direction;
    at least one crossmember which is positioned above the one or more transverse walls, extends parallel to the transverse panels and the one or more transverse walls, and is disposed straddling at least one secondary gantry; and
    a plurality of first connecting rods, each of which connects a corresponding secondary gantry of the at least one pair of the secondary gantries to the at least one crossmember that straddles the corresponding secondary gantry, wherein each first connecting rod is inclined at a non-zero angle relative to a vertical direction, the median plane being partially defined by the vertical direction, and wherein each first connecting rod is mounted to be freely rotatable, via a first end, on a lower part of the at least one crossmember that straddles the corresponding secondary gantry and, via a second end, on an outer lateral part of the corresponding secondary gantry.

2. An aircraft comprising a landing gear and a structural assembly of claim 1, wherein the landing gear can retract into the compartment.

3. The structural assembly of claim 1, comprising one or more pairs of second connecting rods, each of which connects a corresponding transverse wall of the one or more transverse walls to the at least one crossmember, wherein each second connecting rod extends in the vertical direction between the corresponding transverse wall and the at least one crossmember, wherein each second connecting rod is mounted to be freely rotatable, via a first end, on the lower part of the at least one crossmember and, via a second end, on a top edge of the corresponding transverse wall, and wherein each second connecting rod is directly attached, at the second end thereof, to the corresponding transverse wall.

4. The structural assembly of claim 3, wherein the second connecting rods of each of the one or more pairs of second connecting rods are connected on opposite lateral sides of the corresponding transverse wall.

5. The structural assembly of claim 3, wherein every one of the secondary gantries is positioned such that an uppermost surface thereof extends in the vertical direction beyond the second ends, respectively, of all of the first and second connecting rods.

6. The structural assembly of claim 5, wherein the uppermost surface of every one of the secondary gantries is adjacent to the lower part of the at least one crossmember.

7. The structural assembly of claim 5, wherein the uppermost surface of every one of the secondary gantries is at a same height as a flange of the at least one crossmember, at which the first ends, respectively, of all of the first and second connecting rods are connected to the at least one crossmember.

8. The structural assembly of claim 3, wherein all of the first connecting rods and all of the second connecting rods that are connected to a same crossmember of the at least one crossmember are coplanar with each other.

9. The structural assembly of claim 3, wherein, of the first connecting rods and of the second connecting rods that are connected to the same crossmember, such first connecting rods are inclined at a non-zero angle relative to such second connecting rods.

10. The structural assembly of claim 3, comprising:
one or more pairs of third connecting rods;
wherein each third connecting rod extends in the vertical direction and connects a corresponding main gantry of the plurality of pairs of main gantries to the at least one crossmember; and
where each third connecting rod is mounted to be freely rotatable, via a first end, on the lower part of the at least one crossmember and, via a second end, on an upper part of the corresponding main gantry.

11. The structural assembly of claim 10, wherein each third connecting rod is freely rotatable, about the respective first and second ends thereof, about an axis of rotation that is perpendicular to the longitudinal direction and the median plane.

12. The structural assembly of claim 11, wherein:
each first connecting rod is freely rotatable, about the respective first and second ends thereof, about an axis of rotation that is parallel to the longitudinal direction and the median plane; and
each second connecting rod is freely rotatable, about the respective first and second ends thereof, about an axis of rotation that is parallel to the longitudinal direction and the median plane.

13. The structural assembly of claim 1, wherein:
the outer lateral part of the corresponding second gantries comprises a lateral extension; and
the lateral extension of one secondary gantry in a pair of secondary gantries extends from the one secondary gantry in an opposite direction from the lateral extension of another secondary gantry in the pair of secondary gantries.

14. A structural assembly for an aircraft having a longitudinal direction and a median plane, the structural assembly comprising:
a plurality of pairs of main gantries, wherein, for a pair, the main gantries face one another with respect to the median plane and wherein the pairs are distributed in the longitudinal direction;
two transverse panels that are perpendicular to the longitudinal direction and are fixed to a front and a rear of the plurality of pairs of main gantries to together define a compartment for a landing gear of the aircraft;
at least one pair of secondary gantries which extend parallel to the longitudinal direction between the main gantries and ends of which are fixed to the transverse panels;
one or more transverse walls fixed between each pair of the secondary gantries;
at least one crossmember which extends parallel to the transverse panels and is disposed straddling at least one secondary gantry; and
a plurality of first connecting rods, each of which connects a corresponding secondary gantry of the at least one pair of the secondary gantries to the at least one crossmember that straddles the corresponding secondary gantry, wherein each first connecting rod is inclined at a non-zero angle relative to the vertical direction, parallel to the median plane that is partially defined by the vertical direction, and wherein each first connecting rod is mounted to be freely rotatable, via a first end, on a lower part of the at least one crossmember that straddles the corresponding secondary gantry and, via a second end, on an outer lateral part of the corresponding secondary gantry;
wherein every one of the secondary gantries is positioned such that an uppermost surface thereof extends in the vertical direction beyond the second ends, respectively, of all of the first connecting rods.

15. The structural assembly of claim 14, wherein the uppermost surface of every one of the secondary gantries is adjacent to the lower part of the at least one crossmember.

16. The structural assembly of claim 14, wherein the uppermost surface of every one of the secondary gantries is at a same height as a flange of the at least one crossmember, at which the first ends, respectively, of all of the first connecting rods are connected to the at least one crossmember.

17. The structural assembly of claim 14, comprising:
one or more pairs of further connecting rods;
wherein each further connecting rod extends in the vertical direction and connects a corresponding main gantry of the plurality of pairs of main gantries to the at least one crossmember; and
where each further connecting rod is mounted to be freely rotatable, via a first end, on the lower part of the at least one crossmember and, via a second end, on an upper part of the corresponding main gantry.

18. The structural assembly of claim 17, wherein each further connecting rod is freely rotatable, about the respective first and second ends thereof, about an axis of rotation that is perpendicular to the longitudinal direction and the median plane.

19. The structural assembly of claim 18, wherein:
each first connecting rod is freely rotatable, about the respective first and second ends thereof, about an axis of rotation that is parallel to the longitudinal direction and the median plane; and
each second connecting rod is freely rotatable, about the respective first and second ends thereof, about an axis of rotation that is parallel to the longitudinal direction and the median plane.

\* \* \* \* \*